United States Patent
Kim et al.

(10) Patent No.: US 9,317,149 B2
(45) Date of Patent: Apr. 19, 2016

(54) METHOD FOR DETECTING TOUCH POSITION OF TOUCH SCREEN AND TOUCH SCREEN USING SAME

(75) Inventors: Tae Whan Kim, Seoul (KR); Ju Tae Ryu, Gyeonggi-do (KR); Su Hyeong Park, Gyeongbuk (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 353 days.

(21) Appl. No.: 13/978,447

(22) PCT Filed: Jan. 5, 2012

(86) PCT No.: PCT/KR2012/000127
§ 371 (c)(1),
(2), (4) Date: Jul. 5, 2013

(87) PCT Pub. No.: WO2012/093873
PCT Pub. Date: Jul. 12, 2012

(65) Prior Publication Data
US 2013/0278535 A1    Oct. 24, 2013

(30) Foreign Application Priority Data
Jan. 7, 2011    (KR) .................. 10-2011-0001932

(51) Int. Cl.
*G06F 3/045*    (2006.01)
*G06F 3/041*    (2006.01)
*G06F 3/044*    (2006.01)

(52) U.S. Cl.
CPC ............... *G06F 3/041* (2013.01); *G06F 3/044* (2013.01); *G06F 3/0416* (2013.01)

(58) Field of Classification Search
CPC ..................................... G06F 3/041
USPC ........................................... 345/173
See application file for complete search history.

(56) References Cited

U.S. PATENT DOCUMENTS 8,421,772 B2 *    4/2013    Li et al. .................. 345/174
2009/0115742 A1    5/2009    Mamba et al.
(Continued)

FOREIGN PATENT DOCUMENTS

KR    1020030056685 A    7/2003
KR    100880522 B1    1/2009
(Continued)

OTHER PUBLICATIONS

International Search Report dated Sep. 27, 2012; PCT/KR2012/000127.

*Primary Examiner* — Jason Olson
(74) *Attorney, Agent, or Firm* — Ladas & Parry LLP

(57) ABSTRACT

Disclosed are a method for detecting a touch position of a touch screen and the touch screen using the same. A method for detecting a touch position on a touch screen includes the steps of: detecting a touched touch screen block among touch screen blocks by using signals generated from at least one touch sensor among touch sensors included in a plurality of touch screen blocks into which an area of the touch screen is divided; and detecting a touch position in the detected touch screen block on the basis of a signal of a touch sensor included in the detected touch screen block. Thus, compared to an existing method of processing a signal by reading measurement values of all measurement sensors, the invention enables fast signal processing, thereby reducing measurement signal processing time for measuring a touch position of a touch screen.

12 Claims, 10 Drawing Sheets

(56) References Cited

U.S. PATENT DOCUMENTS

2010/0193258 A1* 8/2010 Simmons et al. .......... 178/18.06
2010/0321214 A1* 12/2010 Wang et al. ..................... 341/20
2010/0328249 A1* 12/2010 Ningrat et al. ................ 345/174

FOREIGN PATENT DOCUMENTS

| KR | 1020090058295 A | 6/2009 |
| KR | 1020090122570 A | 12/2009 |
| KR | 1020100006650 A | 1/2010 |

* cited by examiner

METHOD FOR DETECTING TOUCH POSITION OF TOUCH SCREEN AND TOUCH SCREEN USING SAME

TECHNICAL FIELD

The present invention relates to a method for detecting a touch position of a touch screen and a touch screen using the method, and more particularly, to a method for processing a signal generated in a touch screen and an apparatus using the method.

BACKGROUND ART

Touch screens can be classified into four types of touch screen, such as a resistive film type (pressure sensitive type) touch screen, a capacitive type touch screen, a surface acoustic wave (SAW) type touch screen, and an infrared ray (IR) type touch screen.

The pressure sensitive type (resistive film type) touch screen among them means literally a touch screen that operates by recognizing pressure. The operating principle of the pressure sensitive type touch screen is implemented by applying a material having a resistive component onto glass or a transparent plastic plate, covering the material with a polyethylene (PE) film and installing insulation rods at regular intervals so that two surfaces of the glass or transparent plastic plate are not in contact with each other. In an operating state, if a predetermined current flows through both ends of a resistive film, the resistive film serves as a resistor having a resistive component and thus, a voltages is applied between both ends of the resistive film. If the resistive film is touched by a finger, the PE film on an upper surface of the glass or transparent plastic plate is bent, and the two surfaces of the glass or transparent plastic plate come in contract with each other. Thus, due to a resistive component of the two surfaces, parallel connection of resistors is formed, and a change in resistance occurs.

In this case, a change in voltage occurs due to the current that flows through both ends of the resistive film. The position of the touching finger can be known by a degree of change in voltage. Due to characteristics of the pressure sensitive type touch screen, the two surfaces of the glass or transparent plastic plate must come in contact with each other so that pressure can be recognized. Thus, the pressure sensitive type touch screen is able to operate under pressure generated by a ball pen or other materials. The pressure sensitive type touch screen is used in most full touch type domestic mobile phones. The pressure sensitive type touch screen has advantages of a low price and the capability to write in a small column by writing using a stylus pen. On the other hand, because it uses pressure, the pressure sensitive type touch screen has disadvantages that if a strong pressure is applied to the touch screen, it is not recognized, and it is relatively less sensitive to touch compared to the capacitive type touch screen.

The capacitive type touch screen, unlike the pressure sensitive type touch screen using pressure, is formed of glass having high conductivity, such as indium tin oxide (ITO). The principle of the capacitive type touch screen is to recognize a change in current that flows through the surface of glass by attaching sensors to four corners of the glass.

The instant a finger touches a screen, electrons flowing through the glass flow into a body through the finger, and the changed position of the electrons is sensed by the sensors such that the touch screen operates. The capacitive type touch screen is characterized in that a sense of manipulation and scrolling are more smooth than in the pressure sensitive type touch screen, and multi-touch whereby several points can be touched, can be performed. The capacitive type touch screen operates using a changing quantity of current, and thus does not operate by a fingernail through which no current flows, or a stylus pen. Also, since the sensors are sensitive, they may be affected by peripheral devices.

The capacitive type touch screen is capable of performing multi-touch, unlike the pressure sensitive type touch screen. If the screen is touched by an object through which electricity flows, such as a finger, using only one layer covered with an electro-conductive material, the flow of electricity is changed and thus the touch can be recognized.

In the capacitive type touch screen using an electrostatic force, each cell of a sensing wiring is connected to a controller of a touch screen panel. The controller transmits a measurement signal to each cell corresponding to the sensing wiring and receives a sensing signal generated by a human body when touch occurs on the surface of the touch screen, from the sensing wiring. Sensing signals of horizontal-axis and vertical-axis touch sensing wirings are coordinated so that a touch position can be detected. The capacitive type touch screen has a complicated structure, high manufacturing cost, and a low sensing efficiency due to noise generated by a small capacitance value, in comparison with the resistive film type touch screen. However, the capacitive type touch screen has high transmissivity and operates with a very small pressure compared to the resistive film type touch screen, and thus has good durability.

In a capacitive type touch screen panel, when the human body does not contact the panel, electrostatic capacitance values of sensors are zero or very small, and when the human body contacts the panel, electrostatic capacitance values corresponding to an area formed by a touch pad and the human body are sensed. The shape of the touch pad that senses an electrostatic capacitance may be configured in the following various ways. That is, the touch pad may be a cell type touch pad configured according to position, a touch pad, a contact width that varies depending on position, or an arrangement type touch pad in which wirings having uniform widths are perpendicular to each other. Among these, the arrangement type touch pad in which a horizontal-axis wiring and a vertical-axis wiring are perpendicular to each other is the most commonly-used type.

DISCLOSURE

Technical Problem

Commonly-used touch screens calculate position by reading all measurement values of a horizontal touch sensor and a vertical touch sensor so as to recognize a touch position. When such a method is used, touch screens that implement a small image display device, such as a mobile device, read measurement values of sensors fast such that measurement signal processing time can be sufficiently reduced. However, in a large-area image display device having a relatively large area, such as a monitor or a television (TV), measurement values of sensors to be processed at one time increase geometrically and thus measurement signal processing time may be delayed.

If the number of measurement signal processing devices increases so as to solve the problem of delayed measurement signal processing time, a production price of the touch screen increases.

Thus, the present invention is directed to providing a method for processing a signal of a touch screen, whereby a time for processing measurement signals of the touch screen can be reduced.

The present invention is also directed to providing an apparatus using the method for processing a signal of a touch screen, whereby a time for processing measurement signals of the touch screen can be reduced.

Technical Solution

One aspect of the present invention provides a method for detecting a touch position on a touch screen, including: detecting a touched touch screen block among touch screen blocks by using signals generated from at least one touch sensor among touch sensors included in a plurality of touch screen blocks into which an area of the touch screen is divided; and detecting a touch position in the detected touch screen block on the basis of a signal of a touch sensor included in the detected touch screen block. The detecting of a touched touch screen block among touch screen blocks by using signals generated from at least one touch sensor among touch sensors included in a plurality of touch screen blocks into which an area of the touch screen is divided, may include, if a touched touch screen block is detected by using signals generated from a plurality of touch sensors in one touch screen block among touch sensors included in the plurality of touch screen blocks: adding the signals generated from the plurality of touch sensors in each touch screen block through block switches; transmitting the signals added through the block switches to a signal processing controller through at least one channel switch that operates in synchronization with the block switches; and detecting a touched touch screen block among the touch screen blocks on the basis of the signals transmitted to the signal processing controller. The detecting of a touched touch screen block among the touch screen blocks on the basis of the signals transmitted to the signal processing controller may include, if the touch screen detects only one touch, detecting a signal having the largest intensity among the transmitted signals, and may include, if the touch screen detects a plurality of touches, detecting a signal having a magnitude of more than a predetermined threshold value among the transmitted signals, thereby detecting the touched touch screen block among the touch screen blocks. The adding of the signals generated from the plurality of touch sensors in each touch screen block through block switches may include adding the signals generated from the touch sensors connected to the block switches the instant the block switches are closed. The detecting of a touched touch screen block among touch screen blocks by using signals generated from at least one touch sensor among touch sensors included in a plurality of touch screen blocks into which an area of the touch screen is divided, may include, if a touched touch screen block is detected by using signals generated from one touch sensor among touch sensors included in the plurality of touch screen blocks, transmitting a signal generated from the one touch sensor in the touch screen block to a signal processing controller through channel switches connected to the touch sensor, and detecting a touched touch screen block among the touch screen blocks on the basis of the signal. The one touch sensor among touch sensors included in the touch screen blocks may be a touch sensor disposed in a center of the touch screen block among touch sensors included in the touch screen blocks. The transmitting of a signal generated from the one touch sensor in the touch screen block to a signal processing controller through channel switches connected to the touch sensor and detecting a touched touch screen block among the touch screen blocks on the basis of the signal may include, if the touch screen detects only one touch, detecting a signal having the largest intensity among the transmitted signals, and if the touch screen detects a plurality of touches, detecting a signal having a magnitude of more than a predetermined threshold value among the transmitted signals, thereby detecting a touched touch screen block among the touch screen blocks. The detecting of a touch position in the detected touch screen block on the basis of a signal of a touch sensor included in the detected touch screen block may include: transmitting a signal that is generated in the touch sensor to a signal processing controller by using channel switches connected to the touch sensor included in the detected touch screen block; and detecting a touch position on the detected touch screen block on the basis of the signal transmitted to the signal processing controller. The detecting of a touch position on the detected touch screen block on the basis of the signal transmitted to the signal processing controller may include, if the touch screen detects only one touch, detecting a signal having the largest intensity among the transmitted signals, and if the touch screen detects a plurality of touches, detecting a signal having a magnitude of more than a predetermined threshold value among the transmitted signals, thereby detecting a touch position on the detected touch screen block.

Another aspect of the present invention provides a touch screen including: a touch screen panel including a plurality of touch screen blocks including a plurality of touch sensors; a signal processing controller detecting a touch position on a touch screen block in which a touch is detected, among a plurality of touch screen blocks included in the touch screen panel; and a switch unit first transmitting at least one signal, among signals generated from the plurality of touch sensors included in the plurality of touch screen blocks, to the signal processing controller, and transmitting signals that are generated in the touch screen block in which the touch is detected to the signal processing controller on the basis of a response of the signal processing controller. If the touched touch screen block is detected by using signals generated from the plurality of touch sensors among touch sensors included in the touch screen blocks, the switch unit may include: block switches adding the signals generated from the plurality of touch sensors among the touch sensors included in the touch screen blocks on each touch screen block in which the signals are generated; and channel switches operating in synchronization with the block switches and transmitting the signals added by the block switches to the signal processing controller.

If the touched touch screen block among the touch screen blocks is detected by using a signal generated from one touch sensor among the plurality of touch sensors included in the touch screen blocks, the switch unit may include channel switches transmitting the signal generated from the one touch sensor to the signal processing controller, and transmitting signals generated from the plurality of touch sensors included in the touch screen block in which the touch is detected to the signal processing controller, thereby detecting a touch position on the detected touch screen block. The touch screen may further include a MUX unit adding at least two signals transmitted from the switch unit and transmitting the at least two added signals to the signal processing controller. If the touch screen detects only one touch position, the signal processing controller may detect a signal having the largest magnitude among the signals generated from the touch screen so as to detect the touch position, and if the touch screen detects a plurality of touch positions, the signal processing controller may detect a signal having a magnitude of more than a predetermined threshold value among the transmitted signals so as to detect at least two touch positions.

Effects of the Invention

As described above, in a method for detecting a touch position of a touch screen, and a touch screen using the method, according to an exemplary embodiment of the present invention, the touch screen is divided into a predetermined number of block regions, signals generated from at least one touch sensor among touch sensors included in a plurality of touch screen blocks are measured, and then, values of measurement sensors in which a signal intensity of more than a predetermined value or the largest signal intensity is measured, are again measured, thus performing signal processing.

Thus, compared to an existing method of processing a signal by reading measurement values of all measurement sensors, the invention enables fast signal processing, thereby reducing measurement signal processing time for measuring a touch position of the touch screen.

MODES OF THE INVENTION

Figure 1:
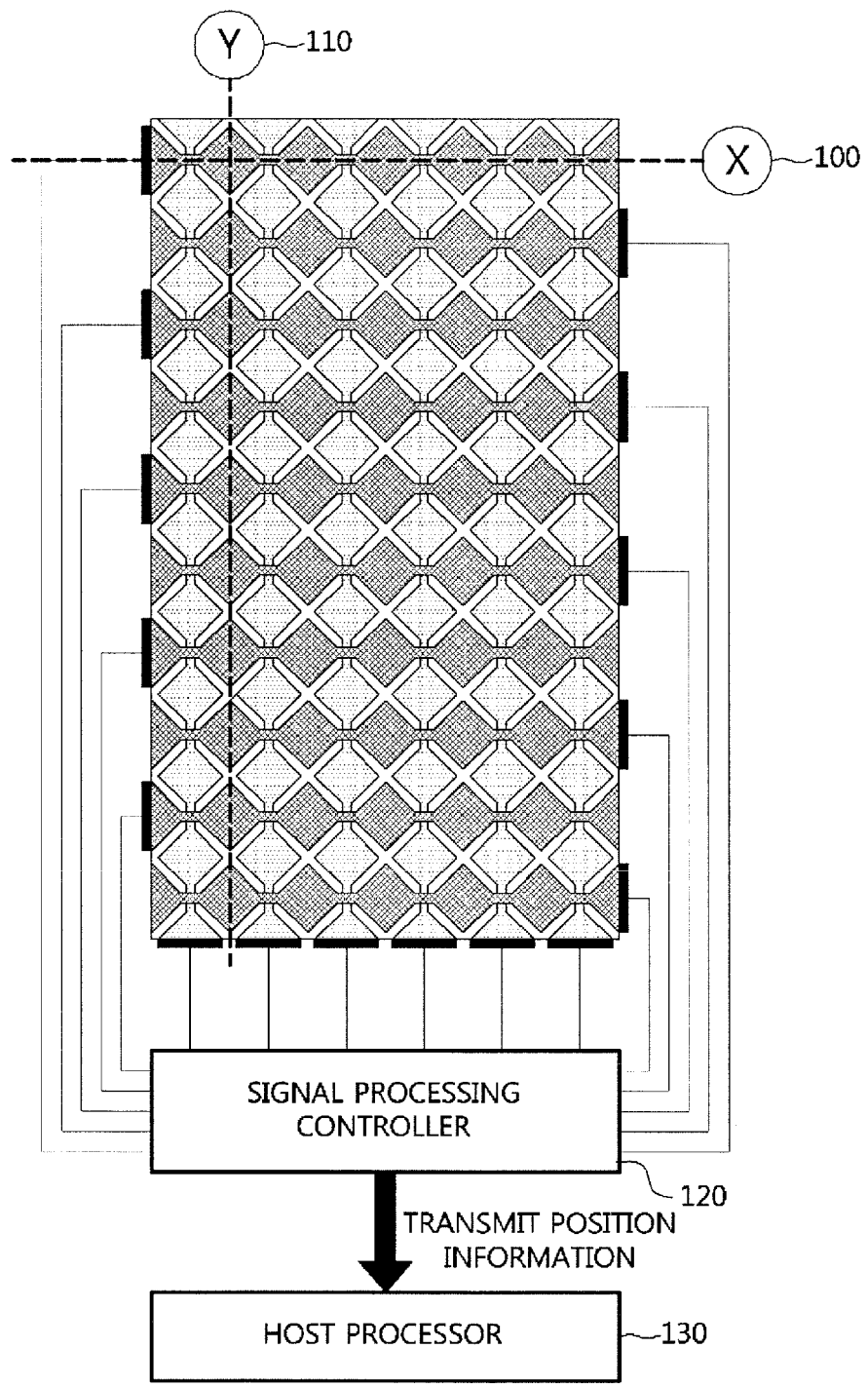
FIG. 1 is a conceptual view illustrating a touch screen panel according to the related art.

The invention now will be described more fully hereinafter with reference to the accompanying drawings, in which illustrative embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals denote like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail. Elements that appear in more than one drawing or are mentioned in more than one place in the detailed description will be denoted by the same respective reference numerals throughout the application and will only be described in detail once.

FIG. 1 is a conceptual view illustrating a touch screen panel according to the related art.

Referring to FIG. 1, the touch screen panel according to the related art may receive position information of a touch screen that a user contacts, using a horizontal-axis sensing wiring 100, a vertical-axis sensing wiring 110, a signal processing controller 120, and a host processor 130.

The horizontal-axis sensing wiring 100 is placed on a horizontal axis of the touch screen and allows a user to know horizontal touch coordinate information that is information regarding a position in a horizontal direction (direction of x-axis in FIG. 1) of the touch screen that is currently touched by the user.

The vertical-axis sensing wiring 110 is placed on a vertical axis of the touch screen and allows the user to know vertical touch coordinate information that is information regarding a position in a vertical direction (direction of y-axis in FIG. 1) of the touch screen that is currently touched by the user.

The signal processing controller 120 may receive the horizontal touch coordinate information and the vertical touch coordinate information from the horizontal-axis sensing wiring 100 and the vertical-axis sensing wiring 110, and may provide the horizontal touch coordinate information and the vertical touch coordinate information to the host processor 130 so as to process touch position information.

The host processor 130 may receive the horizontal and vertical touch position information from the signal processing controller 120 and perform an additional control operation based on the provided touch position information.

Figure 2:
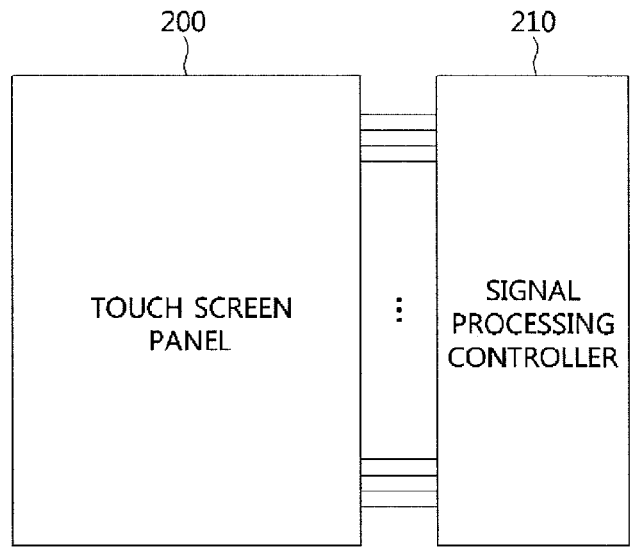
FIG. 2 is a conceptual view of a touch screen panel and a signal processing controller included in a touch screen according to the related art

FIG. 2 is a conceptual view of a touch screen panel and a signal processing controller included in a touch screen according to the related art.

Referring to FIG. 2, signals generated in a touch screen panel 200 may be directly connected to a signal processing controller 210 via a horizontal-axis sensing wiring and a vertical-axis sensing wiring and then may be processed.

In an existing touch screen, signals generated in the touch screen panel 200 are directly input to the signal processing controller 210. Direct connection between a signal processing device and a sensor causes a problem of signal processing time increasing as the number of wirings for connecting sensors increases, as it gets closer to a large-area image display device having a large area of a touch screen.

Figure 3:
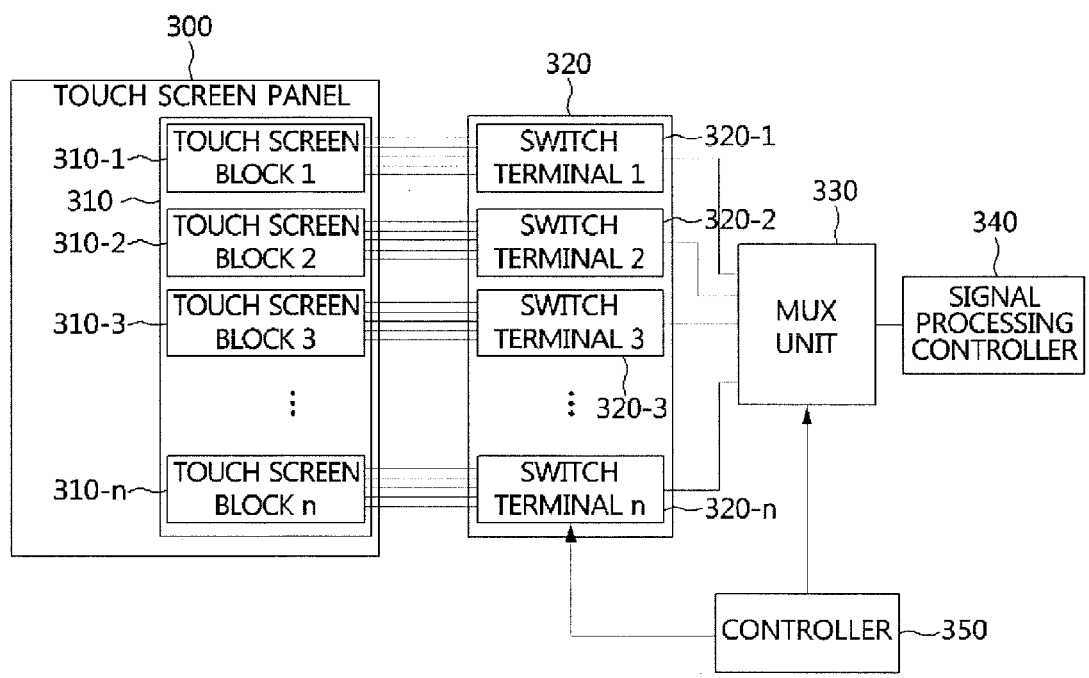
FIG. 3 is a conceptual view illustrating a signal processing circuit that performs a selective measurement method for detecting a touch position on a touch screen panel according to an exemplary embodiment of the present invention.

FIG. 3 is a conceptual view illustrating a signal processing circuit that performs a selective measurement method for detecting a touch position on a touch screen panel according to an exemplary embodiment of the present invention.

In a touch screen panel according to the related art, as illustrated in FIG. 2, the horizontal touch coordinate information and the vertical touch coordinate information calculated on the touch screen panel 200 are measured at one time and supplied to the signal processing controller 210. However, in the selective measurement method according to an embodiment of the present invention, position measurement for calculating touch coordinate information may be divided into two measurement operations, such as first measurement and second measurement, and performed.

Referring to FIG. 3, a touch screen may include a touch screen panel 300, a touch screen block 310, a switch unit 320, a MUX unit 330, a signal processing controller 340, and a controller 350.

In first measurement, the touch screen panel 300 is divided into a plurality of touch screen blocks 310-1, 310-2, 310-3, . . . , and 310-n, and all or part of touch sensor values of the divided touch screen block 310 are transmitted to the signal processing controller 340 via the switch unit 320 and the MUX unit 330, such that it can be calculated whether a position at which the user touches the touch screen is included in the touch screen block 310 of the touch screen panel 300.

The touch screen panel 300 outputs a user interface, and a user's touch is input to the touch screen panel 300 using the output user interface.

The touch screen block 310 is configured by dividing the touch screen panel 300 into at least two regions. The shape of the touch screen block 310 may vary adaptively depending on the configuration of the user interface, or may be a regular shape.

The switch unit 320 may include a plurality of switch units 320-1, 320-2, 320-3, . . . , and 320-n, and each of the plurality of switch units 320-1, 320-2, 320-3, . . . , and 320-n may be connected to an individual touch screen block.

When a touched touch screen block is detected using signals generated from at least two touch sensors among touch sensors included in the touch screen block 310, the switch unit 320 may include block switches that add the signals generated from the at least two touch sensors among touch sensors included in the touch screen blocks 310 according to each touch screen block in which the signals are generated, and channel switches that transmit the signals added by the block switches to the signal processing controller 340 and detect a touch position in the touch screen block in which the touch is detected.

When a touched touch screen block 310 among the touch screen blocks 310 is detected using the signals from at least two touch sensors among the touch sensors included in the touch screen blocks 310, the block switches and the channel switches are synchronized with each other and operate simultaneously such that the touched touch screen block 310 among the touch screen blocks 310 can be detected.

When a touched touch screen block 310 among the touch screen blocks 310 is detected using a signal generated from one touch sensor among the touch sensors included in the touch screen blocks 310, the switch unit 320 may include channel switches that transmit the signal generated from one touch sensor to the signal processing controller 340, detect the touched touch screen block 310, and detect a touch position on the detected touch screen block 310.

The switch unit 320 may be connected to the touch screen blocks 310 and may transmit or add signals generated from sensors included in the touch screen block 310.

The MUX unit 330 may add the signals transmitted by the switch unit 320 and may transmit the added signals to the signal processing controller 340.

The controller 350 may be connected to the switch unit 320 and the MUX unit 330, may control On/Off timing of switches, and may control the MUX unit 330 to which signals generated from the switches are input, to perform signal processing.

The signal processing controller 340 may determine which block among blocks included in the touch screen panel 300 a touch occurs in, or which position of the block the touch occurs in, based on the signals transmitted by the MUX unit 330.

A first measurement determines in which a touch screen block 310 the user touches the touch screen panel 300. This may be performed according to a grouping measurement method, whereby it is determined which block of the touch screen contains a position touched by the user by transmitting measurement values of at least two sensors included in the touch screen block 310 included in the touch screen panel 300 to the signal processing controller 340, and a random measurement method, whereby it is determined which touch screen block 310 among blocks included in the touch screen panel 300 includes a position touched by the user by transmitting measurement values of one sensor among sensors included in blocks included in the touch screen panel 300 to the signal processing controller 340, may be used.

In a second measurement, detailed information regarding a touch position touched by the user may be received using values of a sensor included in a detected block so as to know a position touched by the user within a block calculated through first measurement based on a position of the block.

In the selective measurement method, it is determined which touch screen block 310 of the touch screen panel 300 the user touches by dividing the touch screen panel 300 into a plurality of touch screen blocks 310, thus detecting a touch position.

According to an embodiment of the present invention, the touch screen panel 300 may be divided into a predetermined number of touch screen blocks 310 having the same sizes and the same shapes. However, due to various factors, such as utilization frequency, density, and the number of touch sensors disposed on the touch screen, one touch screen panel 300 may be divided into touch screen blocks 310 having different sizes and shapes.

In the grouping measurement method, in a first measurement operation, sensor values of touch sensors included in each touch screen block 310 are added together at one time, and the added sensor values of the touch sensors included in each touch screen block 310 are transmitted to the signal processing controller 340 via the MUX unit 330. The signal processing controller 340 processes the provided signals to determine a touch screen block 310 having the largest sensor value or a touch screen block 310 having a signal value of more than a reference value, and to know that a particular position included in the touch screen block 310 is a position touched by the user, and second measurement is performed on the touch screen block 310.

When a method of circulating the touch screen block 310 having a signal value of more than a predetermined reference value is used, a plurality of touch screen blocks 310 each having a signal value of more than a predetermined reference value can be detected, and a plurality of selected touch screen blocks 310 can be determined when multi-touch is performed.

In the grouping measurement method, a second measurement operation, whereby a specific touch position within the touch screen block 310 on which measurement signals having magnitudes of more than the reference values are measured is calculated, can be performed. In the second measurement operation, all touch sensor measurement values included in the selected touch screen blocks 310 can be transmitted to the signal processing controller 340 via the MUX unit 330.

According to an embodiment of the present invention, the size of a reference block and the number of sensors included in each reference block do not need to exceed the maximum signal number that can be processed by a measurement signal processing device.

A method of setting sizes of a plurality of touch screen blocks 310 included in a reference touch screen panel 300 through first measurement may be performed by the following procedure.

It is assumed that the number of all horizontal-axis touch sensors of the touch screen panel 300 is X_sen, and the number of all vertical-axis touch sensors of the touch screen panel 300 is Y_sen. In this case, it is assumed that the number of horizontal-axis blocks of reference touch screen blocks 310 generated on the entire touch screen panel 300 is x_block, and the number of vertical-axis blocks of the reference touch screen blocks 310 generated on the entire touch screen panel 300 is y_block. If measurement signals are processed by processing all signals of sensors included in the touch screen blocks 310, the number of signals to be processed is X_sen+Y_sen.

In the selective measurement method according to an embodiment of the present invention, in first measurement, signals corresponding to (x_block+y_block) are processed, and in second measurement, signals corresponding to [(X_sen/x_block)+(Y_sen/y_block)] are processed, wherein X_sen/x_block is the number of sensors in direction X included in a block calculated by first position measurement, and Y_sen/y_block is the number of sensors in direction Y included in the block calculated by first position measurement.

Thus, the number of signals processed by the entire selective measurement proposed by the present invention is the sum of the number of X and Y blocks and the number of wirings in one block on axes X and Y, i.e., (x_block+y_block)+[(X_sen/x_block)+(Y_sen/y_block)]. If the maximum signal number that can be processed by the measurement signal processing device is p_control_max, the number of signals processed in each step does not need to exceed the maximum processing signal number of the signal processing controller 340, and thus (x_block+y_block)<p_control_max, and [(X_sen/x_block)+(Y_sen/y_block)]<p_control_max need to be satisfied.

That is, the size of a reference block and the number of sensors included in each reference block do not need to exceed the maximum signal number that can be processed by the measurement signal processing device.

Figure 4:
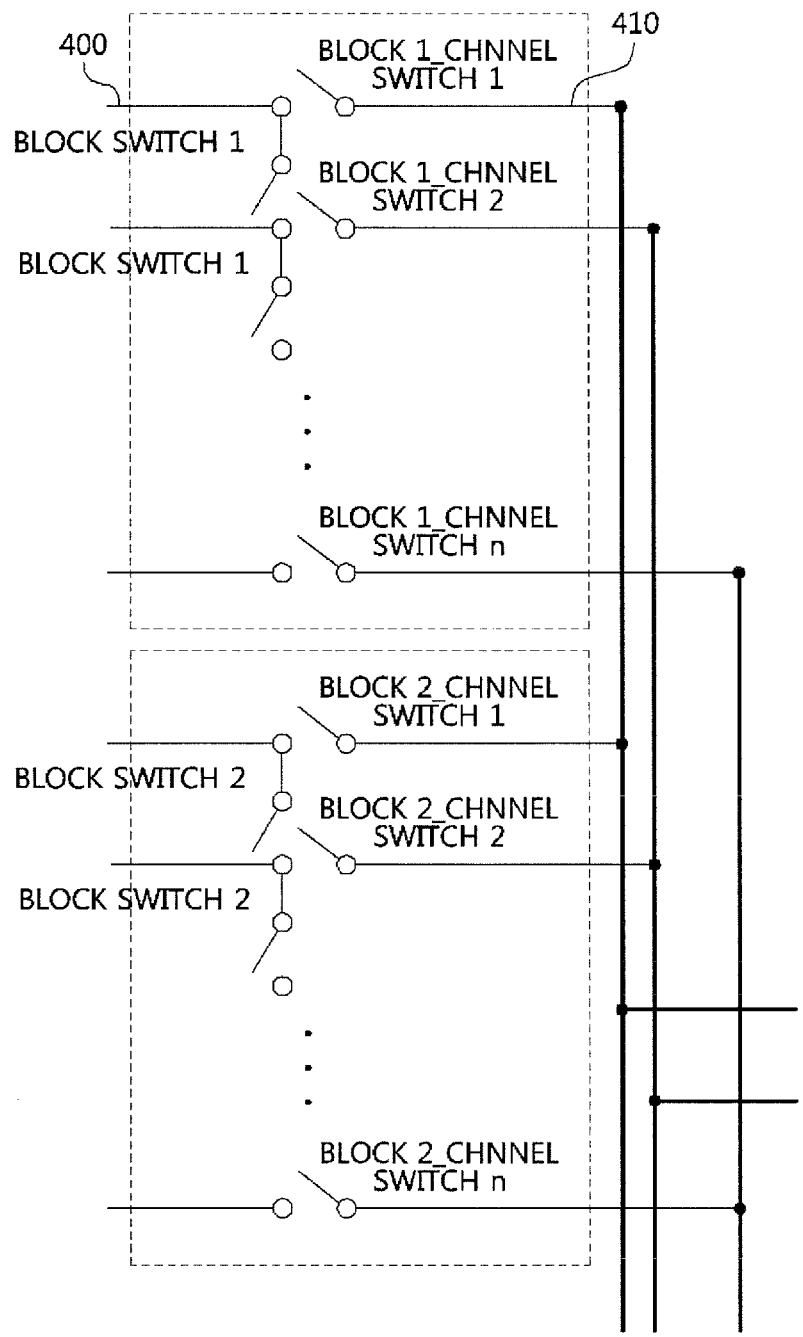
FIG. 4 is a conceptual view illustrating a switch structure for performing a grouping measurement method of selective measurement methods for obtaining touch position information, according to an exemplary embodiment of the present invention.

FIG. 4 is a conceptual view illustrating a switch structure for performing a grouping measurement method of selective measurement methods for obtaining touch position information, according to an exemplary embodiment of the present invention.

Referring to FIG. 4, the switch structure used in the grouping measurement method of the selective measurement methods may include block switches 400 and channel switches 410.

Hereinafter, according to an embodiment of the present invention, FIG. 4 illustrates configurations of the block switches 400 and the channel switches 410 for convenience of explanation, and the configurations of the block switches 400 and the channel switches 410 may be modified within the scope of the present invention.

In first measurement of the grouping measurement method, since all signals of sensors included in a block need to be collected and need to be used to determine whether signals are generated in which block, the block switches 400 for collecting all signals generated in sensors included in the block may be included.

According to an embodiment of the present invention, a method of collecting and transmitting signals of part of sensors included in the block to a signal processing controller may be performed instead of a method of collecting and transmitting signals of all sensors included in the block, and the method is also included in the right scope of the present invention. For example, it may be determined whether a block is selected by connecting the block switches 400 that connect only a plurality of touch sensors disposed in the center of the block and by adding only signals generated in the touch sensors. That is, when only signals of part of sensors included in the block are calculated, only the block switches 400 connected to the sensor are closed so that the signals generated in the sensor can be transmitted.

Also, in second measurement of the grouping measurement method, the channel switches 410 that determine signals of sensors included in a block and detect a specific touch position of the block in which a touch occurs, may be included.

In a first measurement, the block switches 400 included in the touch screen panel may be connected to at least one channel switch of the channel switches 410, and may provide signals generated in touch sensors through the connected channel switch 410 to the signal processing controller, and the signal processing controller may determine the provided signals to detect which block of the touch screen panel a touch occurs in.

In a second measurement, a specific touch position may be found using the channel switches 410 included in the block in which the touch detected by the signal processing controller 340 occurs.

Figure 5:
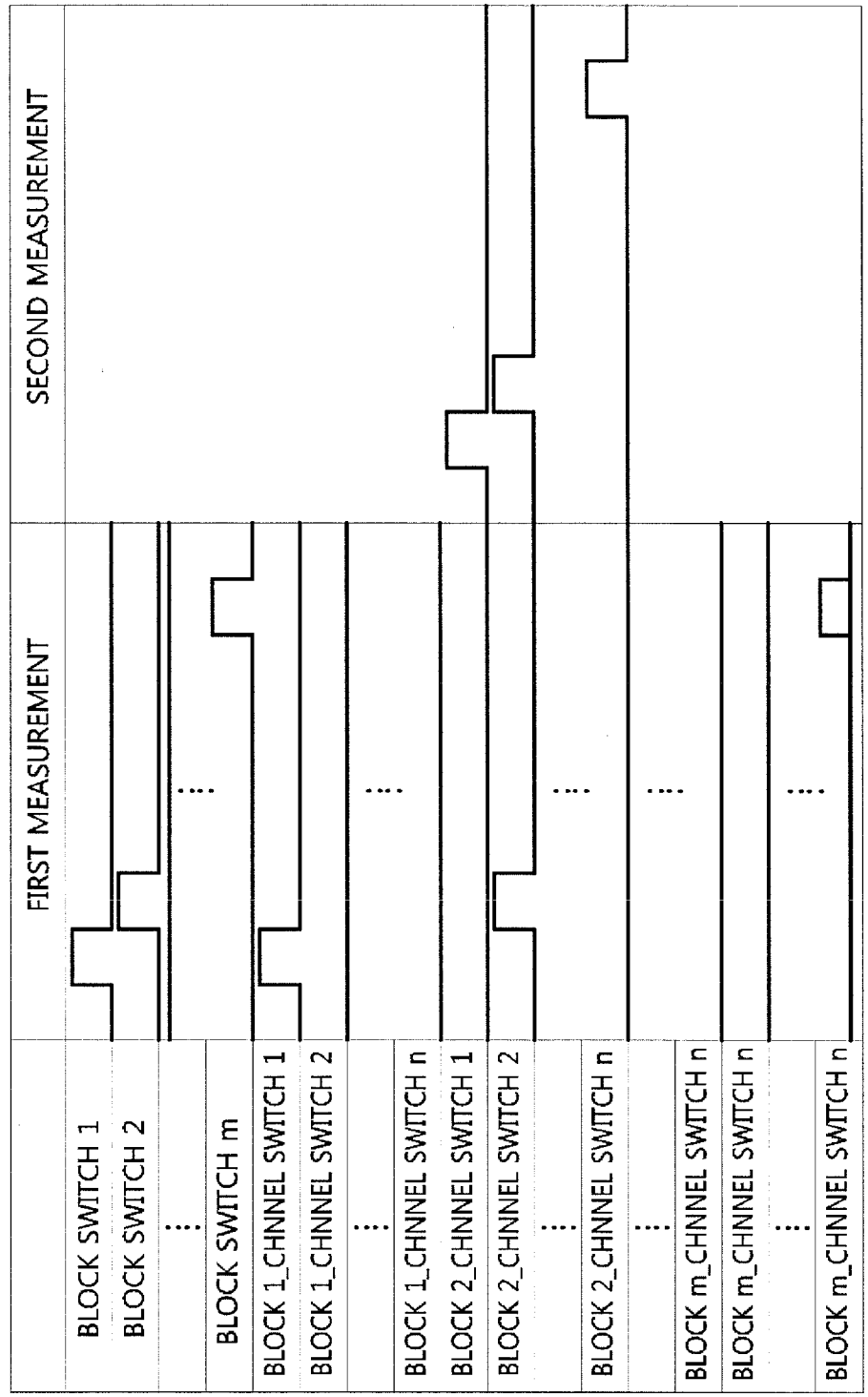
FIG. 5 is a timing diagram illustrating signals generated using a grouping measurement method according to an exemplary embodiment of the present invention.

FIG. 5 is a timing diagram illustrating signals generated using a grouping measurement method according to an exemplary embodiment of the present invention.

Referring to FIG. 5, signals generated in the first measurement and the second measurement are shown in the timing diagram.

Referring to the first measurement, 1 to m block switches may receive signals generated in touch sensors in a block by sequentially closing the 1 to m block switches, and simultaneously may transmit signals generated by closing at least one of channel switches connected to the 1 to m block switches together when the 1 to m block switches are closed, to the signal processing controller.

According to an embodiment of the present invention, each block switch may not be sequentially closed but simultaneously or irregularly closed. In FIG. 5, for convenience of explanation, a channel switch having the same number as the number of the block is closed together with the block switch; however, the 1 to m block switches may transmit signals generated on a block to the signal processing controller when, the instant the block switch is closed, at least one of a plurality of channel switches connected to the block switch is closed together with the block switch.

FIG. 5 illustrates a case in which signals generated in a second block have magnitudes of more than predetermined reference values, as a result of first measurement. In second measurement, only channel switches included in the second block are closed and thus, signals generated in the second block may be measured using the channel switches included in the second block.

In FIG. 5, although touch signals are sensed by sequentially closing the channel switches included in the second block, simultaneous or irregular signals may be generated in addition to sequential signals, so as to determine a specific touch position on the second block of the touch screen panel.

Figure 6:
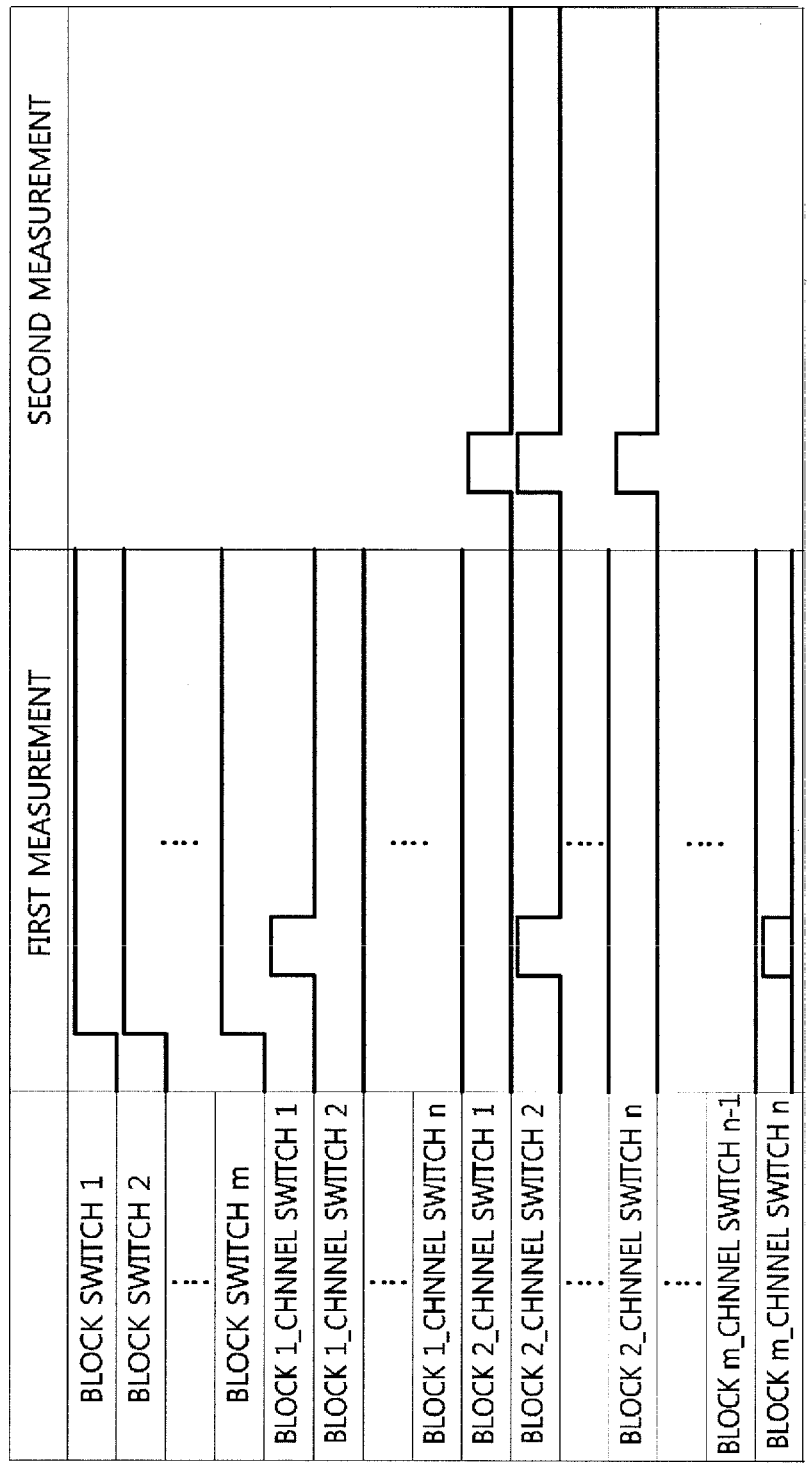
FIG. 6 is a timing diagram illustrating signals generated using a grouping measurement method according to another exemplary embodiment of the present invention.

FIG. 6 is a timing diagram illustrating signals generated using a grouping measurement method according to another exemplary embodiment of the present invention.

Referring to FIG. 6, the block switches and the channel switches do not perform sequential operations but the block switches perform operations of transmitting signals generated in touch sensors when the block switches and the channel switches are simultaneously closed, to the signal processing controller.

Figure 7:
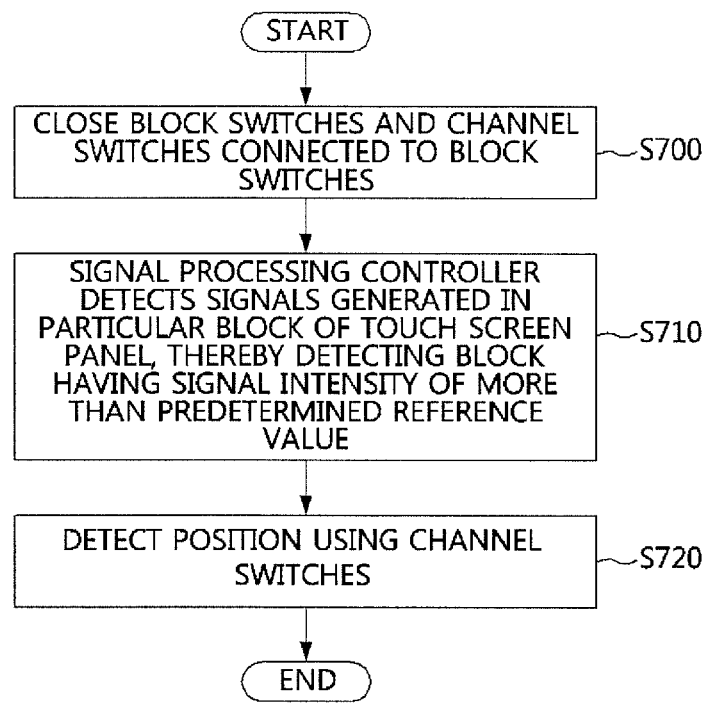
FIG. 7 is a flowchart illustrating a grouping measurement method of selective measurement methods, according to an exemplary embodiment of the present invention.

FIG. 7 is a flowchart illustrating a grouping measurement method of selective measurement methods, according to an exemplary embodiment of the present invention.

Referring to FIG. 7, the grouping measurement method of selective measurement methods, according to an exemplary embodiment of the present invention may first include closing block switches and channel switches connected to the block switches (S700).

In an operation of closing the block switches, the touch screen panel may be divided into a plurality of blocks, and the block switches included in the plurality of divided blocks are sequentially or simultaneously closed and signals generated in sensors are detected, and thus it may be determined which block is touched. In case of a method of detecting the block in which a touch occurs, the sequence of closing the block switches may be irregular.

The instant the block switches are closed, at least one of the channel switches connected to the block switches may be closed. The channel switches are connected to the signal processing controller and thus signals generated in the block may be transmitted to the signal processing controller through the channel switches, and may be processed by the signal processing controller.

The signal processing controller performs an operation of detecting signals generated in a particular block of the touch screen panel and detecting a block having a signal intensity of more than a predetermined reference value (S710).

According to an embodiment of the present invention, the touch position of the touch screen panel is detected using the first measurement, whereby it is determined in which block the largest signals are generated, and using second measurement, whereby it is determined in which position of the block signals are generated.

In FIG. 7, for convenience of explanation, it may be determined in which block is touched by using the first measurement. When only one of touches generated in the touch screen panel is used in the touch screen panel, a block having the largest signal is detected, thus performing the second measurement on the block.

When multi-touch can be implemented on the touch screen panel, signals having magnitudes of more than predetermined reference values are detected from the touches generated in the touch screen panel, thus detecting a plurality of blocks.

An operation of detecting a position is performed using the channel switches (S720).

The second measurement, whereby position detection, is performed using the channel switches, and may be performed on a block having a signal magnitude of more than a predetermined reference value. The channel switches included in the block having a signal magnitude of more than the predetermined reference value are closed so that only signals generated in the channel switches on a predetermined block can be detected.

Figure 8:
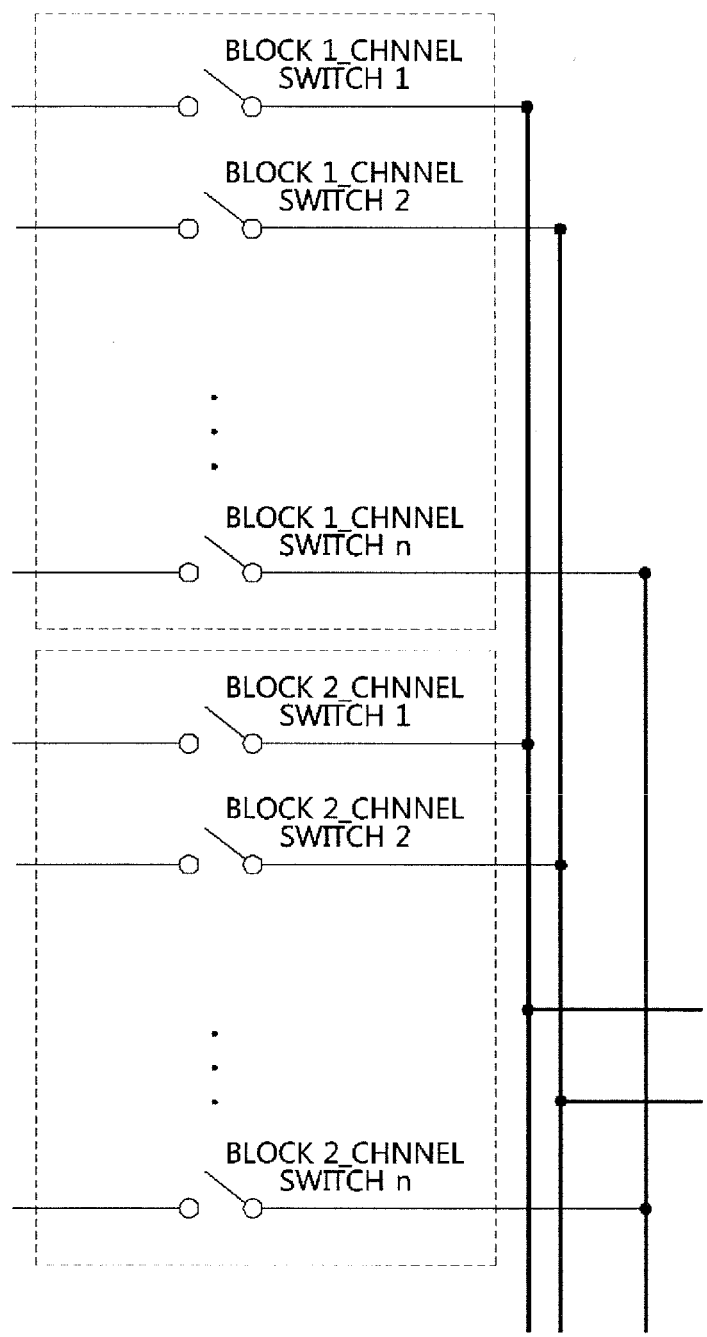
FIG. 8 is a conceptual view illustrating a switch when a random measurement method of selective measurement methods is performed, according to an exemplary embodiment of the present invention.

FIG. 8 is a conceptual view illustrating a switch when a random measurement method of selective measurement methods is performed, according to an exemplary embodiment of the present invention.

In the random measurement method, the touch position is detected using first and second measurements in the same manner as in the grouping measurement method. However, a difference between the random measurement method and the grouping measurement method is that, in the grouping measurement method, signals are transmitted by collecting values of all touch sensors included in each block when the first measurement is performed, whereas, in the random measurement method, touch sensor values of the right center of each block are measured and compared so that a block having a signal magnitude of more than a reference value can be secondarily measured.

In the random measurement method, when a touch occurs on the touch screen panel, it is checked whether touch occurs in the block, from values of the touch sensors disposed in the center of each block using a phenomenon by which a change in electrostatic capacitance of peripheral touch sensors is measured, in addition to directly-touched touch sensors.

According to an embodiment of the present invention, for convenience of explanation, values of sensors disposed in the center of the block are read so as to detect the position of the touched block. However, values of sensors disposed in a portion of the block may be read, and this method is also included within the scope of the present invention.

In the following embodiment of the present invention, for convenience of explanation, a method of calculating a block in which a touch occurs based on signal values generated in sensors disposed in the center of the block has been described. However, a method of detecting a position in which a touch occurs, by detecting signals generated in sensors disposed at a particular position of the block is also included within the scope of the present invention.

Referring to FIG. 8, in the random measurement method, only signals generated in touch sensors disposed at the center of each block are measured, instead of using a method of adding all signals generated in touch sensors in a block, like in the grouping measurement method, so that the block switches may not be used.

Signals generated in sensors disposed in the center of each block are provided to the signal processing controller, and the signal processing controller may detect which block is touched among blocks included in the touch screen panel using the provided signals.

When only one block is selected from the touch screen panel, a block in which the largest signal is generated may be selected, and when multi-touch is supported on the touch screen panel and a plurality of blocks are selected, a block in which a touch intensity is more than a particular threshold value may be detected.

Figure 9:
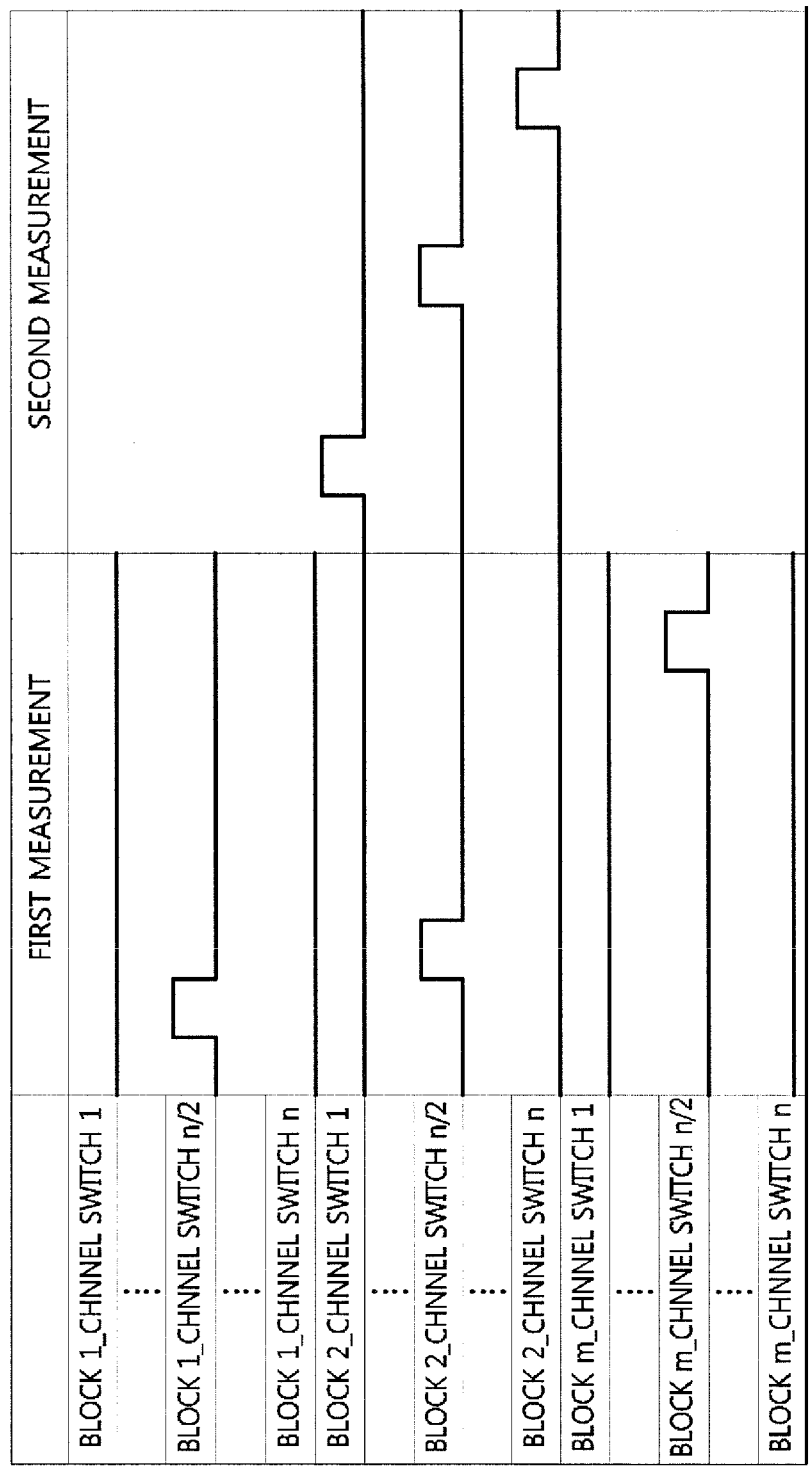
FIG. 9 is a timing diagram of signals generated when a random measurement method of selective measurement methods is performed, according to an exemplary embodiment of the present invention.

FIG. 9 is a timing diagram of signals generated when a random measurement method of selective measurement methods is performed, according to an exemplary embodiment of the present invention.

Referring to FIG. 9, like in the grouping measurement method, a touch position can be detected using the first measurement and the second measurement.

In order to perform the first measurement, a signal may be generated in one sensor among sensors included in a particular block, the signal generated in the sensor may be sensed by the signal processing controller, and it may be determined which block is touched.

In the second measurement, like in the grouping measurement method, a touch position in a block may be detected using only channel switches of the particular block in which the touch occurs.

Figure 10:
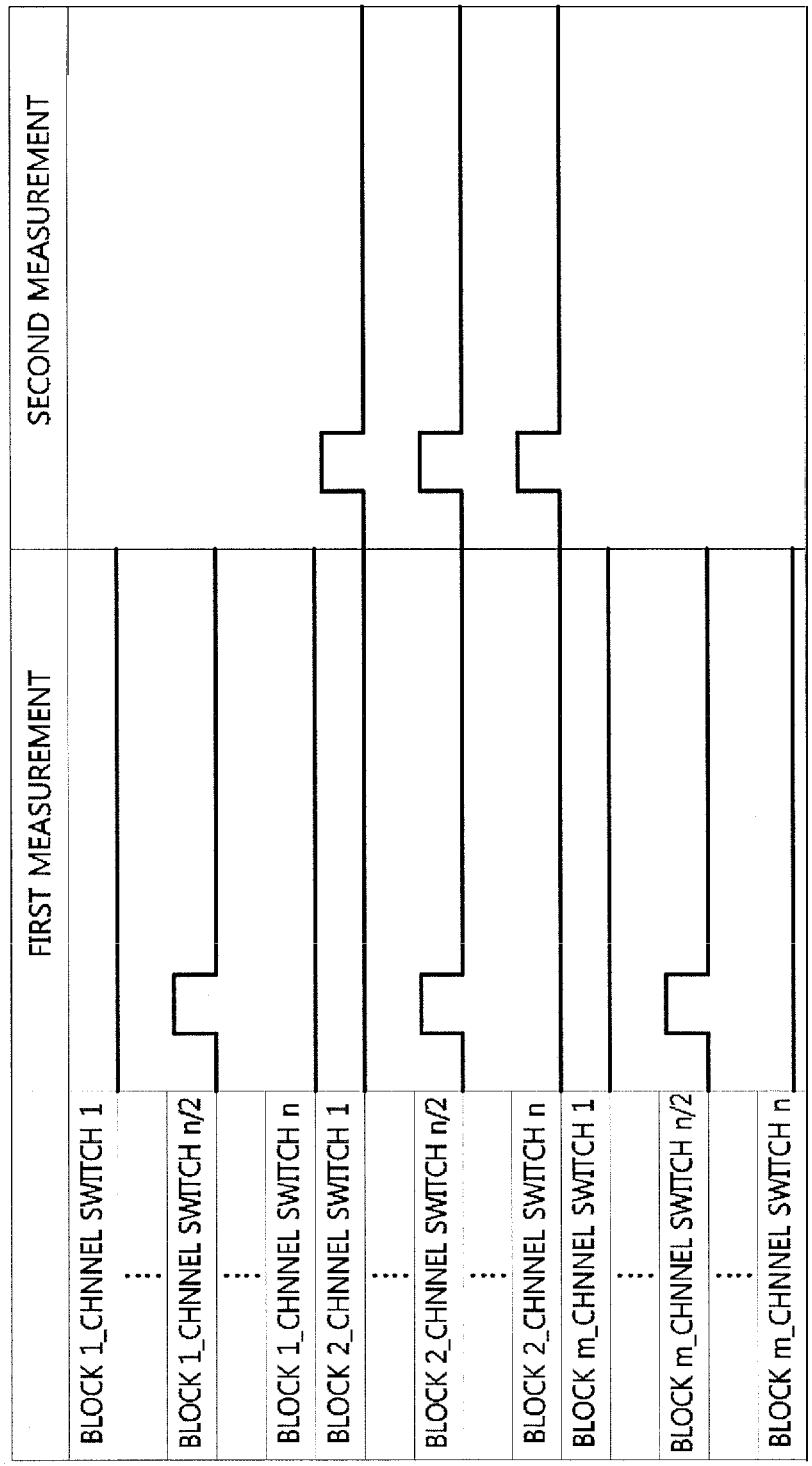
FIG. 10 is a timing diagram of signals generated when a random measurement method of selective measurement methods is performed, according to another exemplary embodiment of the present invention.

FIG. 10 is a timing diagram of signals generated when a random measurement method of selective measurement methods is performed, according to another exemplary embodiment of the present invention.

Referring to FIGS. 9 and 10, in order to detect a touch position on a touch screen panel, switches are sequentially or simultaneously closed so that touch signals can be detected. In addition, the touch position may be detected by simultaneously or sequentially closing the switches within the scope of the present invention.

Figure 11:
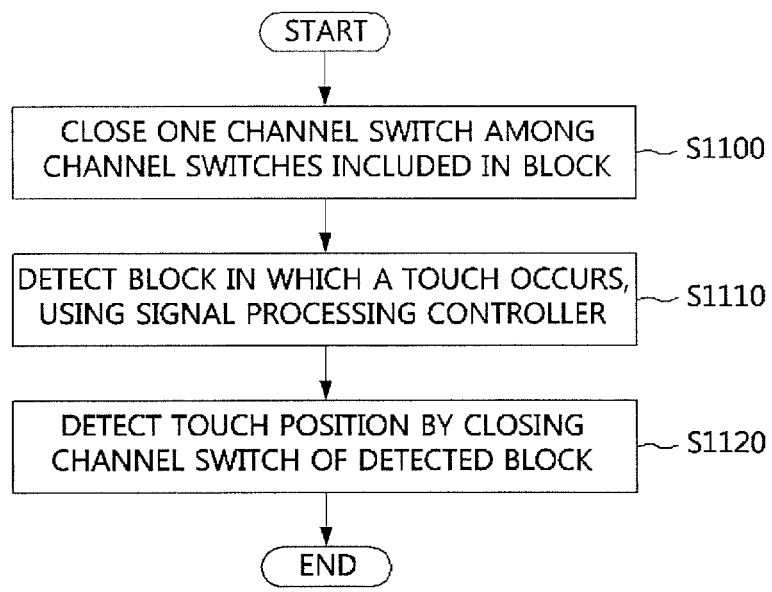
FIG. 11 is a flowchart illustrating a random measurement method of selective measurement methods, according to an exemplary embodiment of the present invention.

FIG. 11 is a flowchart illustrating a random measurement method of selective measurement methods, according to an exemplary embodiment of the present invention.

An operation of closing one channel switch among channel switches included in a block is performed (S1100).

The channel switches may be channel switches connected to sensors disposed in the center of the block, or channel switches connected to sensors disposed in a portion in which most of a touch occurs.

A method of detecting a block in which a touch occurs, by closing channel switches for detecting signals generated in a sensor disposed in the center of the block may be used in the following embodiment of the present invention.

A method of closing the channel switches so as to detect a touch may use a method of sequentially closing the channel switches, a method of simultaneously closing the channel switches, or a combination of a method of sequentially closing the channel switches and a method of simultaneously closing the channel switches.

An operation of detecting a block in which a touch occurs, using a signal processing controller is performed (S1110).

In case of a touch screen panel for detecting only one touch on a block in which a touch occurs, a block in which a sensor for generating the largest signal is included, may be detected. When multi-touch in which a plurality of touches can be detected is implemented on the touch screen panel, a method of detecting a block including touch sensors having signals with intensities of more than predetermined threshold values may be used.

An operation of detecting a touch position by closing channel switches of the detected block is performed (S1120).

A specific touch position may be determined by closing the channel switches included in the detected block.

The sequence of closing the channel switches may be sequential or simultaneous, and a combination of a method of sequentially closing the channel switches and a method of simultaneously closing the channel switches may also be used.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method for detecting a touch position on a touch screen, comprising:
    detecting a touched touch screen block among touch screen blocks by using signals generated from at least one touch sensor among touch sensors included in a plurality of touch screen blocks into which an area of the touch screen is divided; and
    detecting a touch position in the detected touch screen block on the basis of a signal of a touch sensor included in the detected touch screen block,
    wherein the detecting of a touched touch screen block among touch screen blocks by using signals generated from at least one touch sensor among touch sensors included in a plurality of touch screen blocks into which an area of the touch screen is divided, comprises, if a touched touch screen block is detected by using signals generated from a plurality of touch sensors in one touch screen block among touch sensors included in the plurality of touch screen blocks:
    adding the signals generated from the plurality of touch sensors in each touch screen block through block switches;
    transmitting the signals added through the block switches to a signal processing controller through at least one channel switch that operates in synchronization with the block switches; and
    detecting a touched touch screen block among the touch screen blocks on the basis of the signals transmitted to the signal processing controller.

2. The method of claim 1, wherein the detecting of a touched touch screen block among the touch screen blocks on the basis of the signals transmitted to the signal processing controller, comprises, if the touch screen detects only one touch, detecting a signal having the largest intensity among the transmitted signals, and comprises, if the touch screen detects a plurality of touches, detecting a signal having a magnitude of more than a predetermined threshold value among the transmitted signals, thereby detecting the touched touch screen block among the touch screen blocks.

3. The method of claim 1, wherein the adding of the signals generated from the plurality of touch sensors in each touch screen block through block switches comprises adding the signals generated from the touch sensors connected to the block switches the instant the block switches are closed.

4. The method of claim 1, wherein the detecting of a touched touch screen block among touch screen blocks by using signals generated from at least one touch sensor among touch sensors included in a plurality of touch screen blocks into which an area of the touch screen is divided, comprises, if a touched touch screen block is detected by using signals generated from one touch sensor among touch sensors included in the plurality of touch screen blocks, transmitting a signal generated from the one touch sensor in the touch screen block to a signal processing controller through channel switches connected to the touch sensor and detecting a touched touch screen block among the touch screen blocks on the basis of the signal.

5. The method of claim 4, wherein the one touch sensor among touch sensors included in the touch screen blocks is a touch sensor disposed in a center of the touch screen block among touch sensors included in the touch screen blocks.

6. The method of claim 4, wherein the transmitting of a signal generated from the one touch sensor in the touch screen block to a signal processing controller through channel switches connected to the touch sensor and detecting a touched touch screen block among the touch screen blocks on the basis of the signal comprises, if the touch screen detects only one touch, detecting a signal having the largest intensity among the transmitted signals, and if the touch screen detects a plurality of touches, detecting a signal having a magnitude of more than a predetermined threshold value among the transmitted signals, thereby detecting a touched touch screen block among the touch screen blocks.

7. The method of claim 1, wherein the detecting of a touch position in the detected touch screen block on the basis of a signal of a touch sensor included in the detected touch screen block comprises:
- transmitting a signal that is generated in the touch sensor to a signal processing controller by using channel switches connected to the touch sensor included in the detected touch screen block; and
- detecting a touch position on the detected touch screen block on the basis of the signal transmitted to the signal processing controller.

8. The method of claim 7, wherein the detecting of a touch position on the detected touch screen block on the basis of the signal transmitted to the signal processing controller comprises, if the touch screen detects only one touch, detecting a signal having the largest intensity among the transmitted signals, and if the touch screen detects a plurality of touches, detecting a signal having a magnitude of more than a predetermined threshold value among the transmitted signals, thereby detecting a touch position on the detected touch screen block.

9. A touch screen comprising:
- a touch screen panel comprising a plurality of touch screen blocks including a plurality of touch sensors;
- a signal processing controller detecting a touch position on a touch screen block in which a touch is detected, among a plurality of touch screen blocks included in the touch screen panel; and
- a switch unit first transmitting at least one signal, among signals generated from the plurality of touch sensors included in the plurality of touch screen blocks, to the signal processing controller, and transmitting signals that are generated in the touch screen block in which the touch is detected to the signal processing controller on the basis of a response of the signal processing controller, wherein, if the touched touch screen block is detected by using signals generated from the plurality of touch sensors among touch sensors included in the touch screen blocks, the switch unit comprises:
- block switches adding the signals generated from the plurality of touch sensors among the touch sensors included in the touch screen blocks on each touch screen block in which the signals are generated; and
- channel switches operating in synchronization with the block switches and transmitting the signals added by the block switches to the signal processing controller.

10. The touch screen of claim 9, wherein, if the touched touch screen block among the touch screen blocks is detected by using a signal generated from one touch sensor among the plurality of touch sensors included in the touch screen blocks, the switch unit comprises channel switches transmitting the signal generated from the one touch sensor to the signal processing controller, and transmitting signals generated from the plurality of touch sensors included in the touch screen block in which the touch is detected to the signal processing controller, thereby detecting a touch position on the detected touch screen block.

11. The touch screen of claim 9, wherein, if the touch screen detects only one touch position, the signal processing controller detects a signal having the largest magnitude among the signals generated from the touch screen so as to detect the touch position, and if the touch screen detects a plurality of touch positions, the signal processing controller detects a signal having a magnitude of more than a predetermined threshold value among the transmitted signals so as to detect at least two touch positions.

12. A touch screen comprising:
- a touch screen panel comprising a plurality of touch screen blocks including a plurality of touch sensors;
- a signal processing controller detecting a touch position on a touch screen block in which a touch is detected, among a plurality of touch screen blocks included in the touch screen panel;
- a switch unit first transmitting at least one signal, among signals generated from the plurality of touch sensors included in the plurality of touch screen blocks, to the signal processing controller, and transmitting signals that are generated in the touch screen block in which the touch is detected to the signal processing controller on the basis of a response of the signal processing controller; and
- a MUX unit adding at least two signals transmitted from the switch unit and transmitting the at least two added signals to the signal processing controller.

\* \* \* \* \*